(12) United States Patent
Mueller

(10) Patent No.: US 10,424,070 B2
(45) Date of Patent: Sep. 24, 2019

(54) METHODS AND APPARATUS FOR STRUCTURE FROM MOTION ESTIMATION

(71) Applicant: Texas Instruments Incorporated, Dallas, TX (US)

(72) Inventor: Martin Fritz Mueller, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 20 days.

(21) Appl. No.: 15/493,845

(22) Filed: Apr. 21, 2017

(65) Prior Publication Data

US 2017/0309034 A1 Oct. 26, 2017

Related U.S. Application Data

(60) Provisional application No. 62/325,846, filed on Apr. 21, 2016.

(51) Int. Cl.
*G06K 9/00* (2006.01)
*G06T 7/246* (2017.01)
(Continued)

(52) U.S. Cl.
CPC .............. *G06T 7/248* (2017.01); *G06T 5/006* (2013.01); *G06T 7/292* (2017.01); *G06T 7/80* (2017.01);
(Continued)

(58) Field of Classification Search
CPC ........... G06T 7/248; G06T 7/80; G06T 7/292; G06T 7/97; G06T 5/006; G06T 2200/28;
(Continued)

(56) References Cited

U.S. PATENT DOCUMENTS 8,446,468 B1* 5/2013 Medioni ............ G06K 9/00791
348/144
9,373,175 B2* 6/2016 Jung ..................... G06T 7/2086
(Continued)

OTHER PUBLICATIONS

Lucas, B. "An Iterative Image Registration Technique with an Application to Stereo Vision," International Joint Conference on Artificial Intelligence (1981), pp. 674-679, Vancouver, British Columbia, accessed Apr. 21, 2017 https://cecas.clemson.edu/~stb/klt/lucas_bruce_d_1981_1.pdf.

(Continued)

*Primary Examiner* — Shefali D Goradia
(74) *Attorney, Agent, or Firm* — Ebby Abraham; Charles A. Brill; Frank D. Cimino

(57) ABSTRACT

Described examples include an integrated circuit having a point identifier configured to receive a stream of input frames and to identify point pairs on objects in the input frames. A ground plane converter transposes a position of the point pairs to a ground plane, the ground plane having a fixed relationship in at least one dimension relative to a source of the input frames. A motion estimator estimates a motion of the source of the input frames by comparing a plurality of point pairs between at least two input frames as transposed to the ground plane, in which the motion estimator compares a motion estimate determined by the plurality of point pairs and determines a refined motion estimate based on the plurality of point pairs excluding outliers from the plurality of point pairs.

23 Claims, 7 Drawing Sheets

(51) Int. Cl.
G06T 7/292 (2017.01)
G06T 7/80 (2017.01)
G06T 7/00 (2017.01)
G06T 5/00 (2006.01)

(52) U.S. Cl.
CPC ............ *G06T 7/97* (2017.01); *G06T 2200/28* (2013.01); *G06T 2207/10016* (2013.01); *G06T 2207/10028* (2013.01); *G06T 2207/30244* (2013.01); *G06T 2207/30252* (2013.01)

(58) Field of Classification Search
CPC . G06T 2207/10016; G06T 2207/10028; G06T 2207/30244; G06T 2207/30252
See application file for complete search history.

(56) References Cited

U.S. PATENT DOCUMENTS

| | | | |
|---|---|---|---|
| 9,552,640 B2* | 1/2017 | Yoon | G06T 7/70 |
| 2004/0105573 A1* | 6/2004 | Neumann | G06T 17/00 382/103 |
| 2014/0139635 A1* | 5/2014 | Chandraker | H04N 13/204 348/46 |
| 2014/0270484 A1* | 9/2014 | Chandraker | G06T 7/2033 382/154 |

OTHER PUBLICATIONS

Baker, S., "A Database and Evaluation Methodology for Optical flow," International Journal of Computer Vision, 2011, pp. 1-31, vol. 92, Springer Science+ Business Media LLC, 233 Spring Street, New York, NY 10013-1578 USA, accessed Apr. 21 2017, https://vision.middlebury.edu/flow/flowEval-iccv07.pdf.

Hartley, R., Multiple View Geometry in Computer Vision, (Cambridge University Press, 2003), pp. 1-22 Cambridge University Press, University Printing House, Shaftesbury Road, Cambridge CB2 8BS United Kingdom, accessed Apr. 21, 2017, http://www.robots.ox.ac.uk/~vgg/hzbook/.

Elfes, A., "Using Occupancy Grids for Mobile Robot Perception and Navigation." Computer 22.6 (1989): pp. 46-57 0018-9162/89/0600-0046, IEEE, 3 Park Avenue, 17th Floor, New York, NY 10016-5997 USA, accessed Apr. 21, 2017 https://www.cs.cmu.edu/~motionplanning/papers/sbp_papers/integrated4/elfes_occup_grids.pdf.

Horn, B., "Closed-form Solution of Absolute Orientation using Unit Quaternions." JOSA A 4.4 (1987):pp. 629-642 07 40-3232/87 /040629-14, OSA—The Optical Society, 2010 Massachusetts Ave., N.W., Washington, D.C. 20036-1012 USA, accessed Apr. 21, 2017, http://people.csail.mit.edu/bkph/papers/Absolute_Orientation.pdf.

Texas Intruments Incorporated, "TDA2x ADAS System-on-Chip," TI Support No. 681 (2013) Texas Instruments, 12500 TI Blvd, Post Office Box 655303, Dallas, Texas 75265, accessed Apr. 21, 2017, http://www.ti.com/lit/ml/sprt681/sprt681.pdf.

* cited by examiner

METHODS AND APPARATUS FOR STRUCTURE FROM MOTION ESTIMATION

CROSS-REFERENCE TO RELATED APPLICATIONS

This application claims the benefit under 35 U.S.C. § 119(e) to co-owned U.S. Provisional Patent Application Ser. No. 62/325,846, filed Apr. 21, 2016, entitled "Efficient Structure from Motion Pipeline for Embedded Systems," which is hereby incorporated herein by reference in its entirety.

TECHNICAL FIELD

This relates generally to the optical determination of motion estimation.

BACKGROUND

For certain applications, such as robotics and automobile safety devices, it is important to recognize objects in the surrounding environment. One method for achieving this is to reconstruct a 3-dimensional (3D) scene from a single moving camera, commonly known as Structure from Motion (SfM). SfM is computationally intensive and involves complex algorithms. Efficiently and effectively combining the building blocks of SfM to achieve real-time performance is a challenging problem. The main challenges are:
 a. Strong temporal data dependencies leading to complex data management routines;
 b. Computationally intensive building blocks leading to low frame rate/high latency; and
 c. Dependency on camera motion dynamics (slow versus fast motion) requiring dynamic data management.
These challenges are especially severe on embedded systems due to their restricted resources.

SUMMARY

In accordance with an example, an integrated circuit includes a point identifier configured to receive a stream of input frames and to identify point pairs on objects in the input frames. A ground plane converter transposes a position of the point pairs to a ground plane, the ground plane having a fixed relationship in at least one dimension relative to a source of the input frames. A motion estimator estimates a motion of the source of the input frames by comparing a plurality of point pairs between at least two input frames as transposed to the ground plane, in which the motion estimator compares a motion estimate determined by the plurality of point pairs and determines a refined motion estimate based on the plurality of point pairs excluding outliers from the plurality of point pairs.

DETAILED DESCRIPTION

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled." In addition, the term "plurality" as used herein means at least two.

Figure 1:
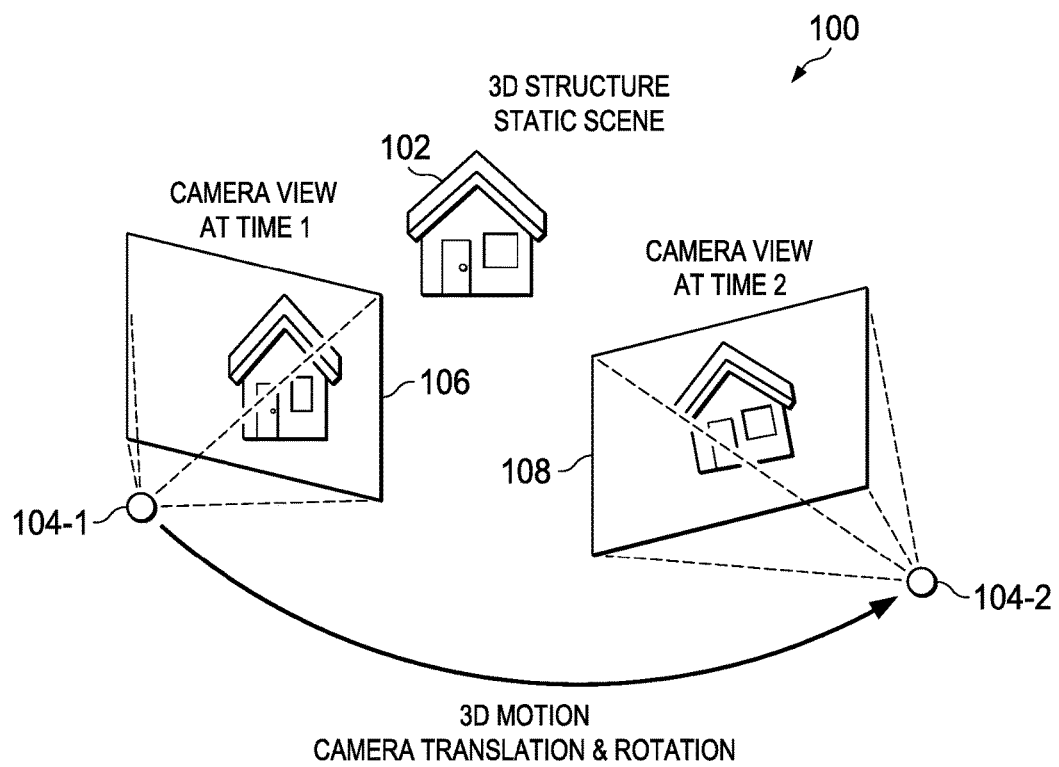
FIG. 1 is a diagram showing operation of a Structure from Motion (SfM) system.

FIG. 1 is a diagram showing the basic operation of a Structure from Motion (SfM) system 100. With SfM, a moving camera continuously takes pictures or frames. For example, an automobile may have a camera for capturing the surrounding scene. Fixed objects within the scene are analyzed to provide a 3D mapping of the area surrounding the automobile. In an example, four 180° cameras are mounted on the sides, front and back of the automobile.

In FIG. 1, a camera (not shown) travels from point 104-1 to 104-2, taking frames 106 and 108, respectively. A fixed object 102 is in the static scene. The change in position and orientation of object 102 between frame 106 and frame 108 allows for determination (as further described hereinbelow) of the static position of object 102 and all significant objects in the scene using triangulation.

Figure 2:
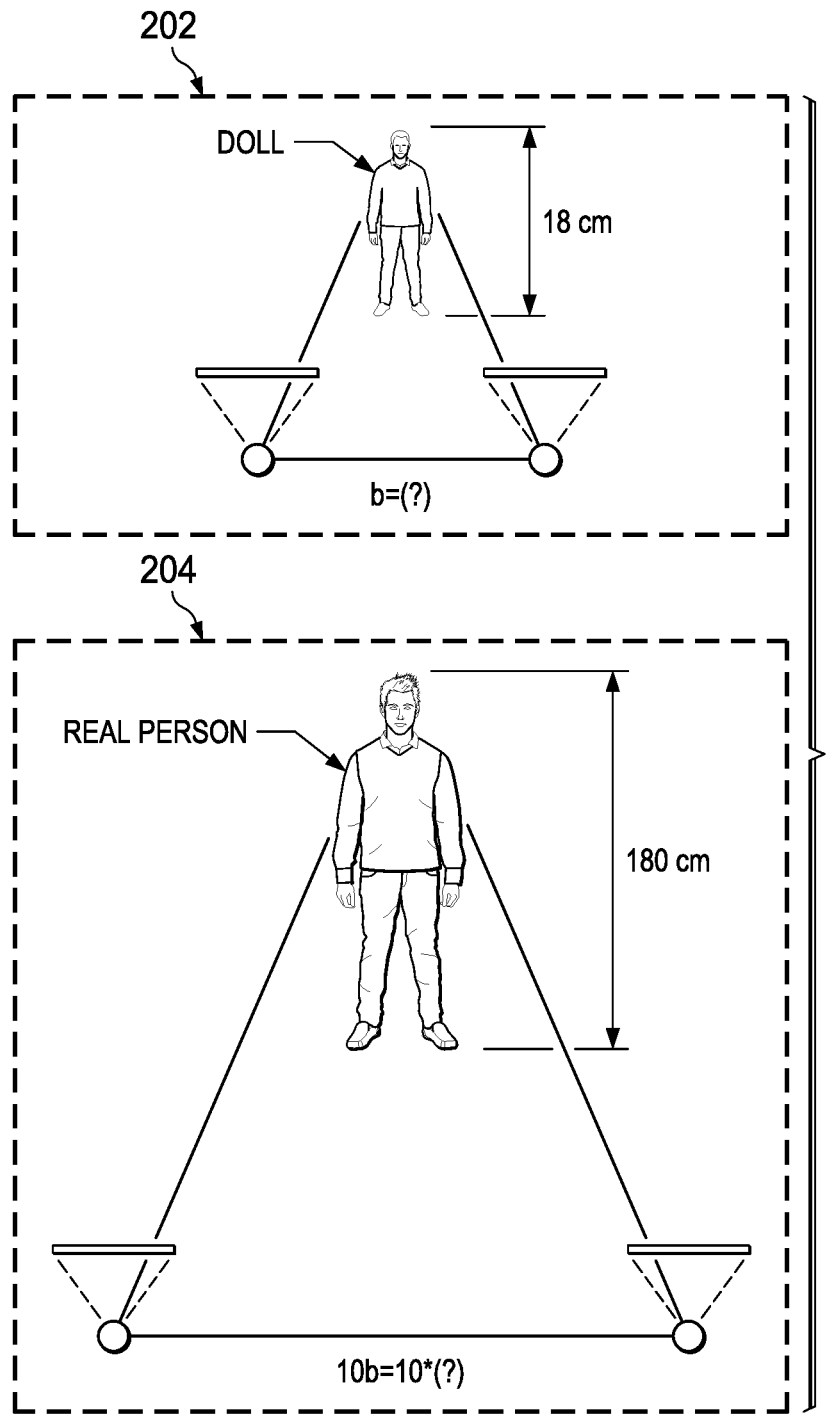
FIG. 2 is an illustration of scale ambiguity.

FIG. 2 is an illustration of scale ambiguity. Prior SfM techniques suffer from limitations. An example is scale ambiguity limitation. The standard SfM algorithm cannot provide an absolute unit of distance (e.g., how far the camera has moved or how far an object is away from the camera), but only a relative measure. FIG. 2 illustrates this limitation. Image 202 is of a doll a distance b away from the camera (not shown). The doll has a height, in this example, of 18 cm. Image 204 is of a hypothetical person having a height of 180 cm, but is a distance of 10b away from the camera. A single camera cannot determine depth perception and thus cannot distinguish between images 202 and 204.

Figure 3:
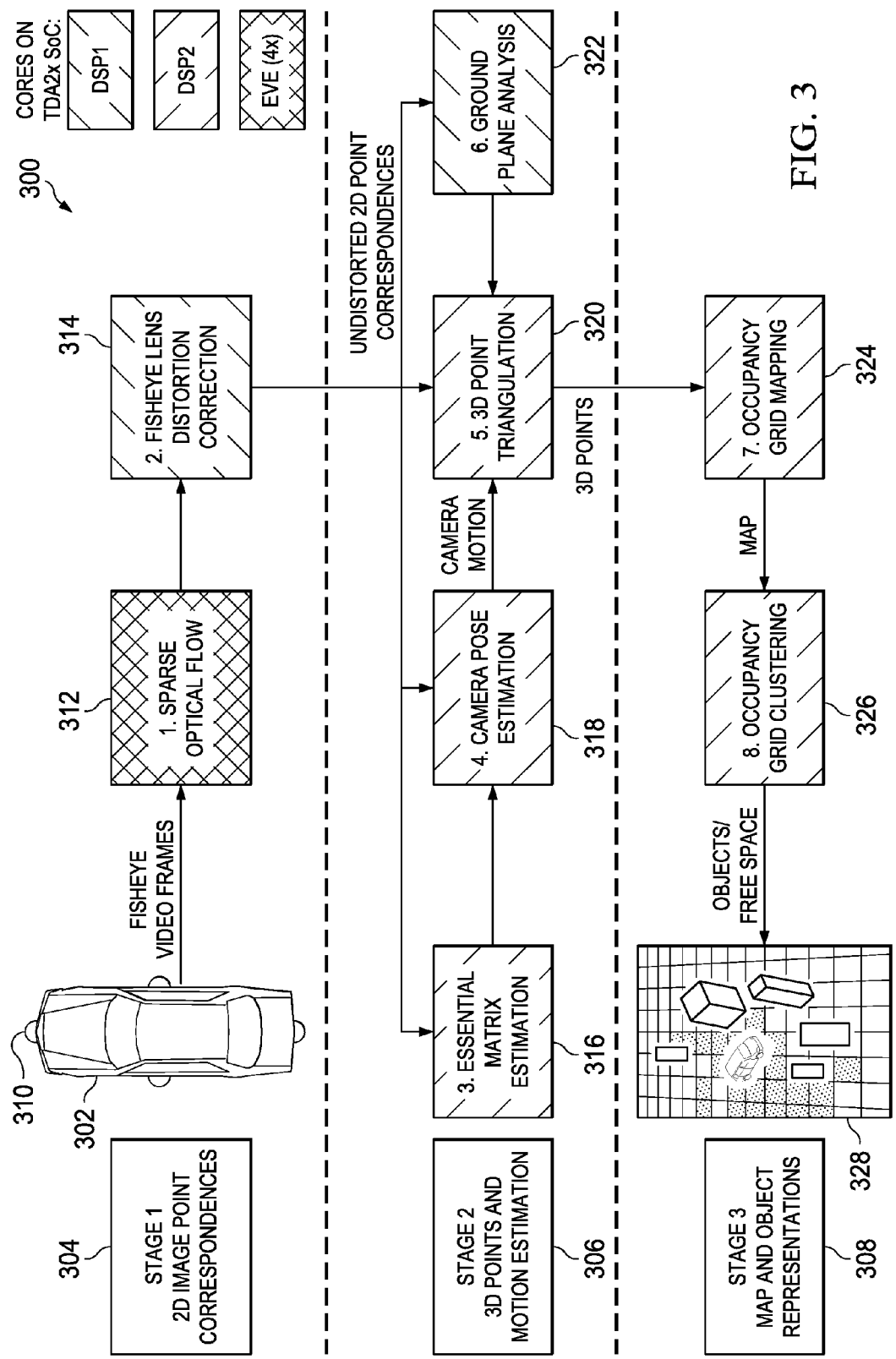
FIG. 3 is a block diagram of an example SfM pipelined system.

FIG. 3 is a block diagram of an example SfM pipelined system. In STAGE 1 (labeled 304), the goal is to find two dimensional (2D) point correspondences between subsequent image frames (called tracks). This problem is solved by a building block called optical flow. Cameras 310 are fish-eye cameras having fish-eye lenses mounted to a vehicle 302 that provide streams of input frames. Cameras 310 use fish-eye lenses to provide 180° coverage of the scene. Due to computational constraints on embedded systems, sparse optical flow block 312 (SOF) (providing hundreds to several thousands of tracks for key feature points) is used. SOF is preferred over dense optical flow (providing a track for every pixel, e.g., a million tracks for a megapixel image). Computational techniques such as Harris corners or Lucas-Kanade tracking can determine key points. The output of SOF 312 is a track for each feature point, which is the location of the point in the current and the past N−1 frames, for example N=16. Fish-eye lens distortion correction block 314 corrects the distortions caused by the fish-eye lens.

In STAGE 2 (306), the core SfM building blocks are executed to obtain camera motion (pose) and three-dimensional (3D) points in space. The core building blocks are: essential matrix estimation unit 316; camera pose estimation unit 318, which encodes camera motion; 3D point triangulation unit 320; and ground plane analysis 322. One way to estimate the essential matrix in block 316 is through 8×9 singular value decomposition (SVD), known as the Direct Linear Transform (DLT) algorithm. In an alternative, more complex linear algebra methods can be used. Triangulation may be solved by a 4×3 linear system of equations, but again more complex methods exist. These key compute components need to be iterated many times, depending on the number of tracked points and the required level of confidence. All this, generally, leads to very high processing cost.

In STAGE 3 (308 in FIG. 3), the information from STAGE 2 (3D points and pose of the camera) is used to create a map of the environment. Occupancy grid mapping unit 324 may be used for mapping. Processing maps to obtain relevant information (e.g., in occupancy grid clustering unit 326), again can be computationally intensive tasks. The result is a three-dimensional map 328 of the scene.

A simple procedural design of the SfM pipeline, where all the steps are executed one after another, would result in low frame rate for the entire pipeline. The low frame rate results because the system frame rate is limited by the slowest building block, namely the compute-intensive functions in STAGE 2 (306). However, for STAGE 1 (304), it may be desirable to maintain a high frame rate to ensure that tracks are being tracked reliably while the camera is moving. A faster frame rate becomes more desirable as the camera is moving faster and the scene gets closer, because pixel displacement in the frames will then increase, which makes finding pixel correspondences more difficult. Therefore, a parallel design provides better performance because parts of the pipeline that require high frame rate can run as separate threads from the functions that include compute bottlenecks and that therefore must be executed at a lower frame rate.

Figure 4:
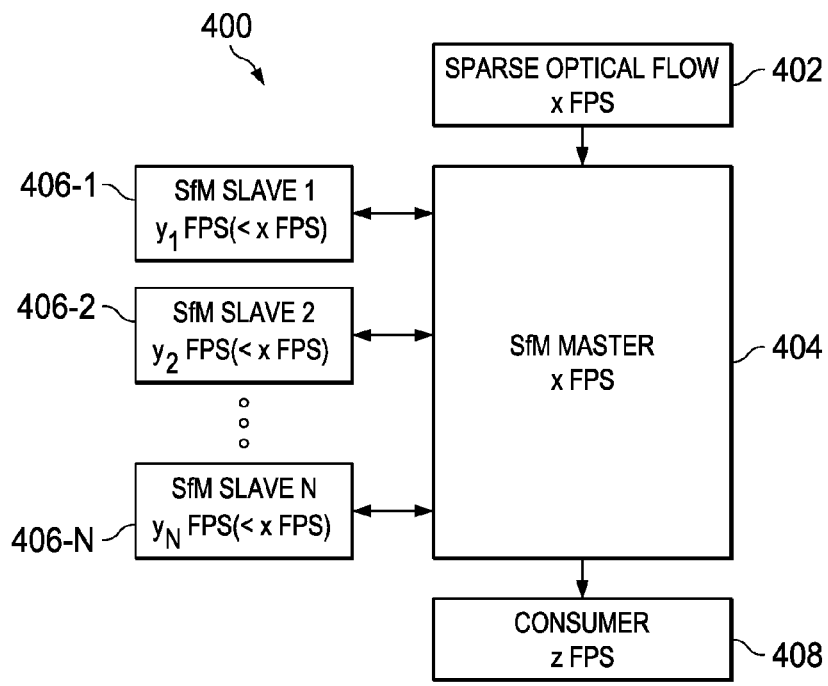
FIG. 4 is a block diagram of an example architecture for parallel processing.

FIG. 4 is a block diagram of an example architecture for parallel processing for SfM. System 400 may be implemented using a system-on-chip (SoC) device or may include several chips in a hybrid package, mounted together on a printed circuit board, packaged in a multi-chip module, or packaged separately. Sparse optical flow 402 feeds SfM master 404. SfM master 404 executes, in some examples, at the highest frame rate needed in the system, e.g. the frame rate needed to ensure reliable optical flow. Computationally intensive core functions that need not run at the highest frame rate (or that have to be sacrificed to run at a lower frame rate due to limited resources) are assigned separate slave threads, shown as SfM Slave 1-SfM Slave N. These slave threads are controlled by the SfM Master 404 on Sfm Slave 1-Sfm Slave N processors (labeled 406-1 through 406-N). The architecture shown in FIG. 4 is particularly useful for embedded systems, because a slave thread can be assigned to a separate processor core on the SoC that is particularly efficient at a particular task. The Sfm Master 404 activities can include:

a. Maintain state information of the entire pipeline;
b. Prepare, send, and control computation assignments to slave threads; and
c. Perform light algorithm tasks that easily achieve a high-frame rate.

The tasks allocated to the slaves can include:

a. Process a well-defined task assigned by master as efficiently as possible and return result to master. The slave block does not need to be aware of the state of the SfM pipeline.

SfM Master 404 provides the output of these processes to consumer 408. Consumer 408 is a processor that uses the output of master processor 404. Generally, as used herein, a "consumer" is a device, system or process that uses the output of another device, system or process. In an example, consumer 408 can be a video display processor to provide a visual map of the scene for display. In other examples, consumer 408 can be a processor to perform other tasks such as collision avoidance.

As an example, the TDA2x SoC provided by Texas Instruments Incorporated can be used to implement the SfM system of FIG. 4 and can run SfM on four cameras simultaneously. The TDA2x family of SoCs include up to thirteen processing cores on chip. Texas Instruments Incorporated also offers other TDAx family SoCs with various number of processing cores on chip that can also be used to implement the arrangements. Among these processing cores on the TDA2x SoC device are: two general purpose processors; two digital signal processor cores (DSPs); and four Embedded Vision Engine (EVE) cores. Six of the more than ten cores on the TDA2x can be utilized to process the pipeline of FIG. 4: one of the camera streams is associated in software with one of the four EVE cores to perform sparse optical flow, so for a four camera case the pipeline employs all 4 EVEs on TDA2x at 30 fps (for example, slave processors 406-2 through 406-5). The SfM master processor function can run at 30 fps on one of the DSPs in the TDA2x such as DSP1 (for example, SfM Master 404), which is one of the two C6x digital signal processors (DSP1 and DSP2) on the TDA2x SOC.

In an example, DSP 1 performs the functions of fish-eye lens distortion correction unit 314 and ground plane analysis unit 322 (FIG. 3) (explained further hereinbelow) and controls the slave processors. Slave 1 can be performed on DSP2 (for example, slave processor 406-1 in FIG. 4) and executes the computationally intensive core SfM functions (316, 318, 320 (see FIG. 3)) for all 4 cameras at 5 fps. Slave 2 on DSP1 also updates the environment map (STAGE 3 308 (FIG. 3)) at 5 fps. A consumer function 408 that visualizes the map on a screen may utilize the output.

FIG. 3 illustrates an example of the above-described implementation. The correspondence between the functions in the blocks in FIG. 3 to the core processors on the TDA2x SoC is shown by hatched fill for the blocks in FIG. 3. The different hatchings indicate which TDA2x core is assigned a block in FIG. 3. In alternative arrangements, different core assignments can be made so the correspondence between the blocks in FIG. 3 and the processor cores can be changed. For example, DSP1 and DSP2 can be swapped. Other multiprocessor devices including SoCs can be used to implement the functions in FIG. 3. Modules, circuit boards, and systems build using multiple stand-alone processor ICs can be used to form alternative arrangements, albeit these may require additional board area and power when compared to the SoC implementations.

Figure 5:
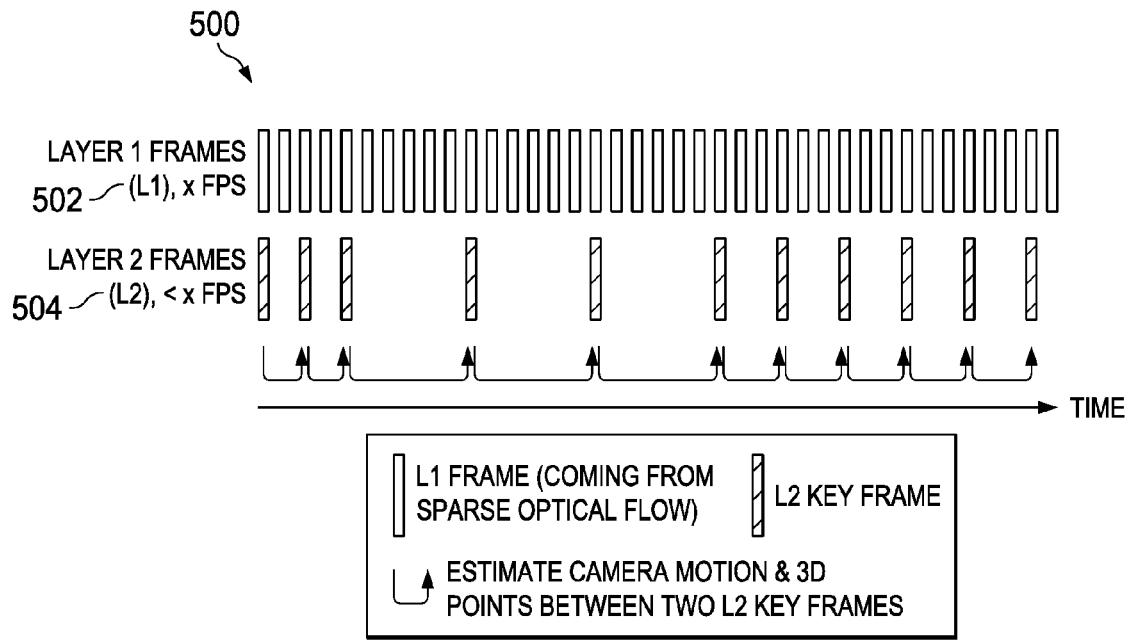
FIG. 5 is an illustration of an example key frame structure.

FIG. 5 is an illustration of a key frame structure for use with the arrangements. Graph 500 shows the relationship between layer 1 frames 502 and layer 2 frames 504. Layer 1 (L1) 502 is the key point track information for frames provided by the camera at 30 fps, for example. Layer 2 (L2) 504 is subset of frames from layer 1 selected to reduce the loss of information from discarding frames from layer 1. The core performing SfM Slave 1 (sparse optical flow 402 (FIG. 4)) requires as an input the key feature correspondences between two frames (frame 1 and frame 2) and returns the camera motion that has occurred between the capture of frame 1 at time 1 and the capture of frame 2 at time 2. Also, Slave 1 returns the 3D point for each key feature correspondence and an associated confidence. This describes the functionality of Slave 1. The process is more fully explained hereinbelow.

The SfM Master (404 in FIG. 4) feeds the SfM Slave 1 (406-1 in FIG. 4) with two frames at a time. The SfM Master could send the current and the previous frame (i.e. layer 1 frames 502). However, because SfM Slave 1 cannot sustain the SfM Master's frame rate, SfM Slave 1 will drop some frames if this approach is used. Therefore, system 400 (FIG. 4) cannot provide an SfM estimation from those frames, which may lead to wrong camera pose results. Instead, in the arrangements, SfM Master 404 (FIG. 4) identifies key frames and passes the key frame to SfM Slave 1 (in sparse optical flow 402 (FIG. 4)) for processing. The key frames (also called Layer 2 frames or L2-frames) are a subset of the incoming frames (also called Layer 1 frames or L1-frames). System 400 (FIG. 4) performs camera motion estimates and 3D point triangulation only between key frames. FIG. 5 illustrates the key frame structure.

The key frame layer structure provides flexibility for varying camera motion speeds. At low camera motion speeds the camera may move very little between two L1 frames. The distance that the camera has moved during this time is the baseline. To perform SfM triangulation, the system needs a certain minimum baseline between two frames, depending on the distance of observed objects. Thus, L2 frames may have an extended time between two key frames when camera motion speeds are low. At high camera motion speed, L2 key frames must have a short time between frames. The processing capability of the processor core performing SfM Slave 1 limits how quickly SfM Slave 1 can process the frames. The key frame structure allows for flexibility in providing frames to SfM Slave 1 at a rate compatible with the processor core's computation throughput.

Figure 6:
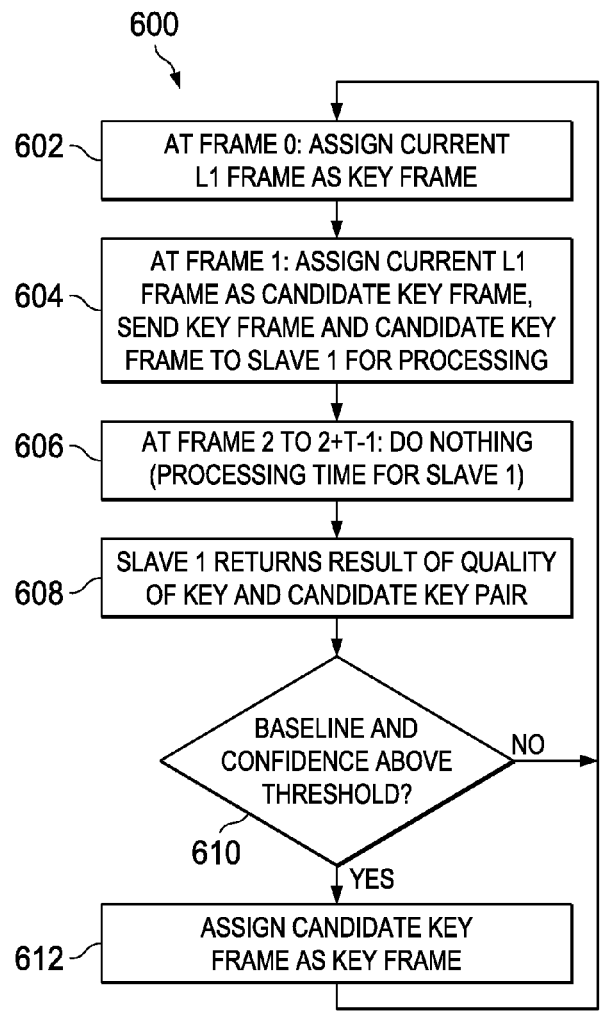
FIG. 6 is a flow diagram of an example method for selecting key frames.

FIG. 6 is a flow diagram of a method 600 for a method for selecting key frames. Method 600 selects key frames (L2) from L1 frames using the following procedure:
 a. Step 602: L1 Frame 0: Initialization: Assign current L1 frame as key frame
 b. Step 604: L1 Frame 1: Assign current L1 frame as candidate key frame. Send last key frame and candidate key frame to Slave 1 for processing.
 c. Step 606: L1 Frame 2 to 2+T−1 (T=processing time for Slave 1 406-1 (FIG. 4)): do nothing
 d. Step 608: L1 Frame 2+T: Slave 1 406 returns result. Check quality of key and candidate frame pair:
   i. Step 610 and 612: If baseline enough and high confidence: Assign candidate frame as key frame. Confidence can be determined in several ways. For example, using low outlier over inlier ratio, using time-consistency of motion estimate (for example, car can't be at 10 mph in one frame and then at 20 mph in the next), or using low optimization residual in essential matrix estimation.
   ii. Step 610: If baseline small or low confidence: Do nothing (candidate frame is not accepted as key frame)
 e. Repeat steps 602 to 612 continuously.

Another advantage of the key frame structure is its efficiency in terms of memory space and movement. The memory stores two frames at a time: the last key frame and the candidate frame. Once a candidate frame becomes a key frame, the method can delete the information of the last key frame. A simple memory reference switch can implement the assignment of a key frame. No data copying is necessary.

SfM Master 404 and SfM Slave 1 processor (406-1 in FIG. 4) can work on a shared memory space in DDR memory, so DDR data movement only occurs when:
 a. SfM Master assigns a new candidate frame and writes its data to shared memory;
 b. SfM Slave 1 reads frame pair data from shared memory;
 c. SfM Slave 1 writes core SfM result back to shared memory; and
 d. SfM Master reads core SfM result from shared memory.

The master-slave processor configuration and the use of the sparse optical flow enable efficient and flexible implementation of an SfM pipeline. One characteristic of this pipeline described hereinabove is that it obtains camera motion estimates at the low frame rate of SfM Slave 1 performing the sparse optical flow 402 (FIG. 4) because essential matrix estimation unit 316 (FIG. 3) in the core SfM algorithm 300 is a computationally intensive task. A small embedded processor cannot sustain a high frame rate. However, high-frame-rate camera motion estimates are often desirable. For example, for smooth, low-latency visualization, for collision avoidance, or for accurate fusion/synchronization with other sensors, high frame rates are needed. The need for higher frame rates makes a more efficient mechanism for determining camera motion than essential matrix estimation desirable. Ground plane analysis is a more efficient estimation technique.

Figure 7:
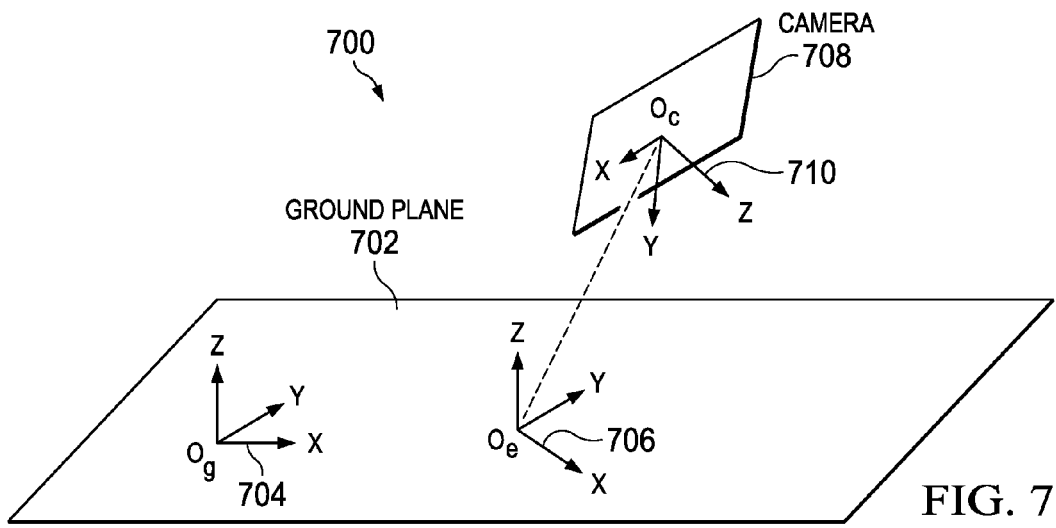
FIG. 7 is a diagram of three related coordinate systems for ground plane analysis of a scene around a vehicle.

FIG. 7 is a diagram of the three related coordinate systems 700 for ground plane analysis of a scene around a vehicle. Coordinate system 704 is the fixed system of the ground plane 702. Coordinate system 706 is the system of the vehicle containing camera 708. For example, the y direction of coordinate system 706 may be the forward direction of travel for the vehicle, the x direction is to one side and the z direction is vertical from the ground plane. Coordinate system 706 moves with the vehicle relative to the fixed coordinate system 704. Coordinate system 710 is the coordinate system of the camera 708. The x and y directions are in the plane of the frames taken by camera 708. The z direction is out of the camera 708 and the frames taken by camera 708 do not directly represent the z direction.

Ground plane analysis unit 322 (FIG. 3) uses the coordinates systems 704, 706 and 710. Some basic assumptions predicate the ground plane analysis described hereinbelow. The assumptions are:
 a. existence of a ground plane;
 b. camera can see the ground plane (at least partially);
 c. camera moves parallel to the ground plane. More precisely, the camera height to the ground plane is constant and the camera has a fixed relationship to the ground plane in at least one dimension; and
 d. the angle between ground plane's normal axis and camera's optical axis is constant Ground plane analysis unit 322 (FIG. 3) can be implemented as a ground plane ego-motion (GPEM) estimator. GPEM is useful with, for example, ground-moving vehicles equipped with cameras (cars, robots, etc.). In addition to analyzing the data from one camera, GPEM is easily extensible to perform joint motion estimation for a multi-camera system, which is a very difficult task using other techniques.

Moreover, GPEM overcomes the scale-ambiguity problem of SfM. As noted regarding FIG. 2 hereinabove, the core SfM algorithm does not provide the scale of the estimated motion and 3D reconstruction, meaning that the distance unit of translation and 3D points coordinates is unknown. GPEM can provide this scale by making use of the assumptions above, and can provide scale correction for the core SfM algorithm. That is, for an object point on the ground plane, the height of the camera and the angle of the object vis-à-vis the camera is known. This information allows for determination of the precise distance of the object point without scale ambiguity.

In the described examples of GPEM processing, GPEM uses as input a sparse optical flow (L2 frames 504 (FIG. 5) in the form of image point correspondences between two subsequent frames of a video stream). The GPEM output is estimated camera motion between the two frames.

FIG. 7 is a diagram showing the relationship of coordinate systems used in GPEM. The x-y plane of a coordinate system $O_g$ (coordinate system 704) describes the ground plane fixed with the ground. Points with positive z-values are above ground. The camera's coordinate system $O_c$ (coordinate system 710) is located at the camera's optical center. The z-axis points along the optical axis, and the image plane is in the x-y plane of $O_c$. A third coordinate system $O_e$ ("ego," coordinate system 706) has a fixed Euclidean transformation (rotation and translation) to the camera coordinate system and lies in the ground plane (x-y-plane). The coordinate system $O_e$ corresponds to the location of the ground-based platform (e.g., car) that the camera is mounted on. The camera stays fixed with the platform, but both the platform and the camera can move with respect to the ground coordinate system.

Rotation and translation describe a Euclidean transformation and may be written in homogeneous coordinates as Equation 1:

$$M = \begin{bmatrix} R & t \\ 0\ 0\ 0 & 1 \end{bmatrix} \quad (1)$$

where R is a 3×3 rotation matrix and t is a 3×1 translation vector.

The Euclidean transformation between a coordinate system $O_i$ and a coordinate system $O_j$ is denoted $M_{ij}$ and satisfies $X_i = M_{ij} X_j$ where $X_i$ and $X_j$ are the homogeneous coordinates of 3D point X=(x, y, z, 1) in coordinate systems $O_i$ and $O_j$, respectively.

At given time step k, the goal is to find the Euclidean transform $M_e(k)$, which satisfies Equation 2:

$$M_{eg}(k) = M_e(k) M_{eg}(k-1) \quad (2)$$

Where $M_e(k)$ is the motion of the ego-platform with respect to the ground coordinate system.

Equation 2 assumes that all imaged points are on the ground plane and that the points are from frame k and k−1. Then, a homography (2D projective transform) $H_{ce}$ relates the image point p and ground plane point q (imaged) as shown in Equation 3:

$$p_c(k) = H_{ce} q_e(k) = H_{ce} M_{eg}(k) q_g(k) \quad (3)$$

and in Equation 4:

$$p_c(k-1) = H_{ce} q_e(k-1) = H_{ce} M_{eg}(k-1) q_g(k-1) = H_{ce} M_e(k)^{-1} M_{eg}(k) q_g(k) = H_{ce} M_e(k)^{-1} q_e(k) \quad (4)$$

Deriving from these two equations provides Equation 5:

$$H_{ce}^{-1} p_c(k) = M_e(k) H_{ce}^{-1} p_c(k-1) \quad (5)$$

Defining $p'(k) := H_{ce}^{-1} p_c(k)$ and $p'(k-1) := H_{ce}^{-1} p_c(k-1)$, the estimation problem is to find $M_e(k)$ for which $\|p'(k) - M_e(k) p'(k-1)\|^2$ is minimum.

Equation 5 is difficult to satisfy absolutely because of measurement noise/errors (point matches not correct) and model errors (point on ground plane). However, as described hereinbelow, outlier rejection can remove both sources of error.

From $M_e(k)$, the motion of the camera $M_c(k)$ can be determined from Equation 6:

$$M_c(k) = M_{ce} M_e(k) M_{ec} \quad (6)$$

Where $M_{ce}$ is the fixed Euclidean transformation between the ego-platform and the camera coordinate system and $M_{ec}$ is its inverse, $M_{ec} = M_{ce}^{-1}$. Camera calibration procedures can obtain $M_{ce}$ beforehand and thus $M_{ce}$ is known.

While camera 708 is acquiring a stream of input frames, at time k, an assumption is that corresponding image points $\{p_k\}$ and $\{p_{k-1}\}$ at times k and k−1, respectively, are available from, for example, the optical flow. Mathematical projection of these image points onto the ground plane and a 2-dimensional motion analysis in the ground plane reduces the problem from generally six motion parameters in three dimensions to three motion parameters in two dimensions.

Normalized coordinates describe the image point. That is, the normalized coordinates include correction for intrinsic camera parameters and are aligned with the camera coordinate system $O_c$. In other words, a 3D point X projected on the camera has image coordinates of Equation 7:

$$p = [I\ 0] M_{ce} X_e \quad (7)$$

where I is the 3×3 identity matrix and "0" is a 3×1 zero vector.

From Equation 7, for a point on the ground plane, which has coordinates $X_e = (x, y, 0, 1)$, the relationship becomes Equation 8:

$$p = [R_1 R_2 t] X_e' := H_{ce} X_e' \quad (8)$$

where $R_1$ ($R_2$) is the first (second) column of the rotation matrix of $M_{ce}$, t is the translation vector of $M_{ce}$, and $X_e' = (x, y, 1)$ is $X_e$ represented in the two-dimensional coordinate system $O_e'$, which is 0, without the z-axis.

The 3×3 matrix $H_{ce}$ defines a 2D projective transform between the ground plane and the camera image plane. An image point p=(x, y, 1) can be projected onto the ground plane by applying the inverse of $H_{ce}$, as in Equation 9:

$$X_e' = H_{ec} p. \quad (9)$$

If the imaged 3D point (whose image is p) lies on the ground plane, then $X_e'$ is the location of that point in 3D space. If the imaged 3D point does not lie on the ground plane, then $X_e'$ is not the true location of that point in 3D space. In this case, the error compared to the true location is dependent on the height of the point and camera location/orientation.

Given the corresponding image points $\{p_k\}$ and $\{p_{k-1}\}$, if many of the image points originate from ground points, ground plane analysis unit 322 (FIG. 3) may project these points to the ground plane and perform analysis in the 2-dimensional ground plane. Points in $\{p_k\}$ that are not in the ground plane will result in outlier data points, which ground plane analysis unit 322 (FIG. 3) can detect and remove from the estimation process. Ground plane analysis unit 322 (FIG. 3) detects outliers by exploiting the fact that the outliers do not conform to the motion estimate produced by most of the points, which are "good" points (ground points/inliers). The GPEM estimator in ground plane analysis unit 322 (FIG. 3) implements an iterative robust filtering scheme to extract the true ground points from all points and performs motion estimation only, in some examples, on these inlier points.

Figure 8:
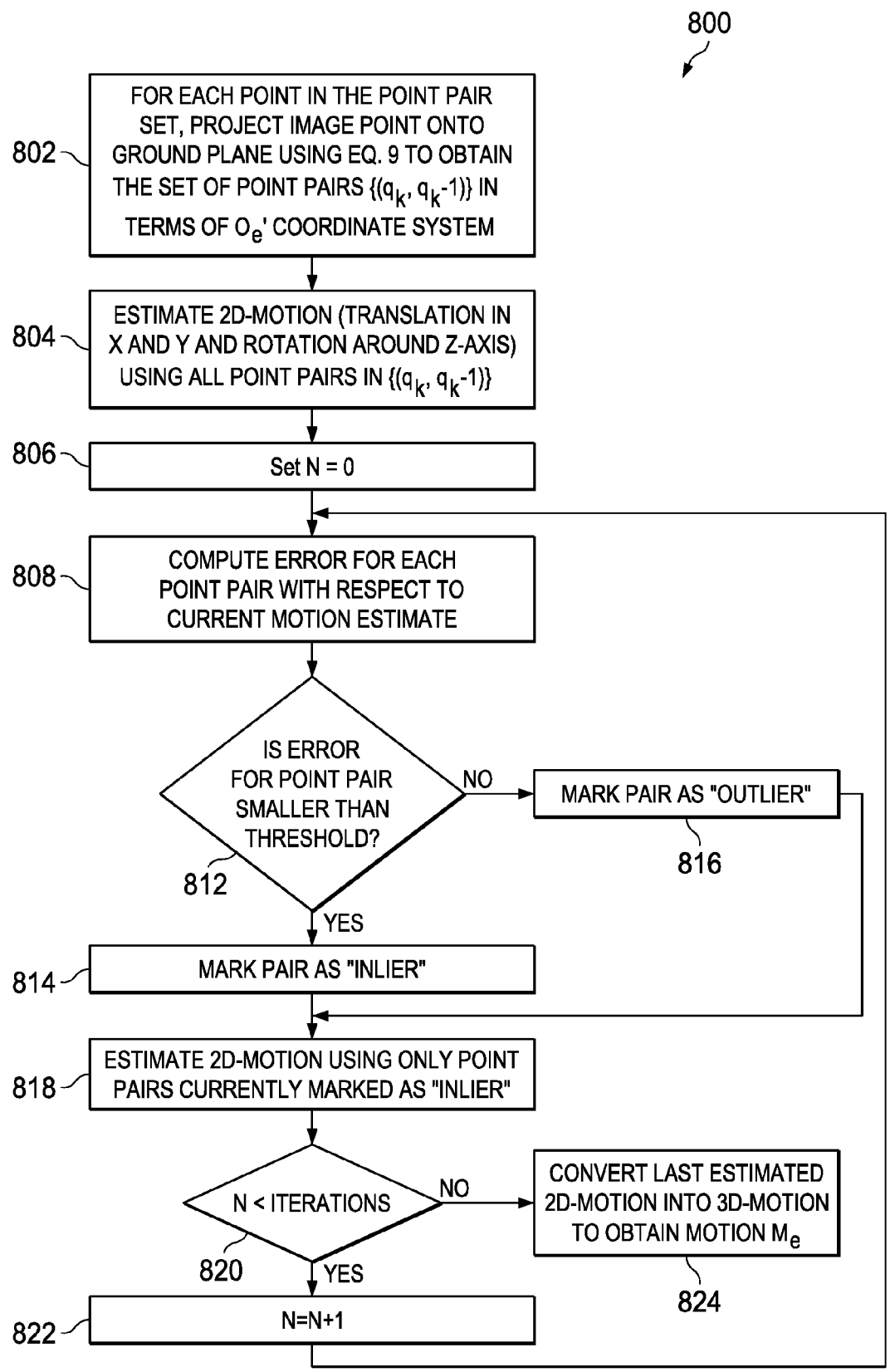
FIG. 8 is a flow diagram of an example method.

FIG. 8 is a flow diagram of example method 800. Method 800 processes sets of corresponding image points $\{p_k\}$ and $\{p_{k-1}\}$ ("point pairs," or $\{(p_k, p_{k-1})\}$) from frames k and k−1. Step 802 projects the image point onto ground plane using Equation 9 to obtain the set of projected point pairs $\{(q_k, q_{k-1})\}$ in terms of $O_e'$ coordinate system for each point in the point pair set. The sets of corresponding image points may be provided as a sparse optical flow as described regarding FIG. 5.

Step 804 estimates 2D-motion (translation in x and y and rotation around z-axis) using all point pairs in $\{(q_k, q_{k-1})\}$. Step 804 determines the motion estimation (i.e., the Euclidean transform that maps each point at time k−1 to its corresponding at time k) for a set of point pairs by, for example, by minimizing a cost function with respect to the motion transform parameters. The cost function penalizes the sum of squared Euclidean distances between each point at time k and its transformed corresponding point at k−1. Equation 10 is an example cost function.

$$\text{Cost}(M) = \Sigma_i w^i \| p_k^i - M(p_{k-1}^i) \|^2 \tag{10}$$

Where M is the Euclidean transform sought after and where $w^i$ are weighting factors for each point, which represent the confidence bestowed on a point. In some methods, $w^i = 1$ for all i.

However, to provide a more accurate cost measure, step 804 incorporates a priori information about a point being an accurate correspondence and being on the ground plane into these weighting factors. This information includes confidence from the optical flow algorithm (incorporating accurateness of correspondence), distance of a point from the vehicle (closer points are more likely to belong to the ground plane), triangulation results from SfM pipeline from previous frames (points with small estimated height are more likely to belong to ground plane).

This technique for estimating the motion solves "an absolute orientation" problem. In three dimensions, the technique may use numerical matrix inversion, e.g. using singular value decomposition. However, in two dimensions, step 804 uses an algebraic technique that is more efficient because calculations in the two-dimensional ground plane are more efficient.

Step 806 sets an iteration counter N to zero. Step 808 computes a point motion estimate error for each point pair with respect to the current motion estimate. The error inversely relates to how well a point conforms to the motion estimate. Equation 11 computes the absolute error for point pair i:

$$\text{Err}(M,i) = \| p_k^i - M(p_{k-1}^i) \| \tag{11}$$

Step 812 determines if point pair is an outlier or inlier. Equation 12 determines if point pair i is an outlier:

$$\text{Err}(M,i) > a \| p_k^i - p_{k-1}^i \| + b \tag{12}$$

If point pairs are not outliers, then the point pairs are considered inliers. The constants a and b are tunable parameters. The right-hand side of Equation 12, in effect, leads to thresholding the relative error (error divided by the distance between the point pair), which may be a more meaningful measure than absolute error for two reasons. First, it accounts for variable motion magnitudes ("speeds") over time. A larger absolute error is tolerable at larger speeds. Second, in the presence of rotation (not just translation), points far away from the rotation center will move more than points close to the rotation center. The relative error accounts for these requirements. The constant b ensures tolerance for small data noise with very small motion (e.g., almost standstill). Step 814 marks pair points determined to be inliers. Step 816 marks point pairs determined to be outliers.

Step 818 estimates 2D-motion using only point pairs currently marked as "inlier" using the method described hereinabove regarding Step 804. Step 820 determines if the iteration counter N has reached the predetermined fixed number of iterations. If not, step 822 increments counter N and the method loops to step 808. If so, the method proceeds to Step 824, which converts the estimated 2D-motion of step 818 into 3D-motion to obtain motion $M_e$.

Step 824 accomplishes the conversion of the estimated 2D-motion to 3D-motion, for example, as follows: the estimated 2D motion transform M(k) at frame k is of the form of Equation 13:

$$M(k) = \begin{bmatrix} R_{2D} & t_{2D} \\ 0\ 0 & 1 \end{bmatrix} \tag{13}$$

Where $R_{2D}$ is a 2×2 2D rotation matrix and $t_{2D}$ is a 2×1 2D translation vector. M(k) is in the 2D coordinate system $O_e'$.

In the 3D coordinate system $O_e$, the transform takes the form of Equation 14:

$$M_{3D}(k) = \begin{bmatrix} R_{2D} & 0 & t_{2D} \\ 0\ 0 & 1 & 0 \\ 0\ 0 & 0 & 1 \end{bmatrix} \tag{14}$$

$M_{3D}(k)$ is the ego-motion (platform motion) $M_e(k)$ needed to complete Equation 2, which is the camera motion.

An extension of method 800 for multiple cameras uses a separate calibration transform $M_{ec}^j$ for each camera j, which relates each camera to the common ego (platform) coordinate system $O_e$. The difference from the single camera case is projection of all the points from each camera onto the common ground plane. Therefore, rather than using point pairs $\{(p_k, p_{k-1})\}$ from one camera, a multi-camera process uses point pairs $\{(p_k^j, p_{k-1}^j)\}$ for each camera j. In addition, for each camera, the method for multiple cameras projects all points from the selected camera onto ground plane using Equation 9 using the appropriate calibration matrix $H_{ec}^j$. The multi-camera process combines all projected points from all cameras into one set of point pairs $\{(q_k, q_{k-1})\}$ in terms of $O_e'$ coordinate system for processing using steps 806, 808, 812, 814, 816, 818, 820, 822 and 824.

Figure 9:
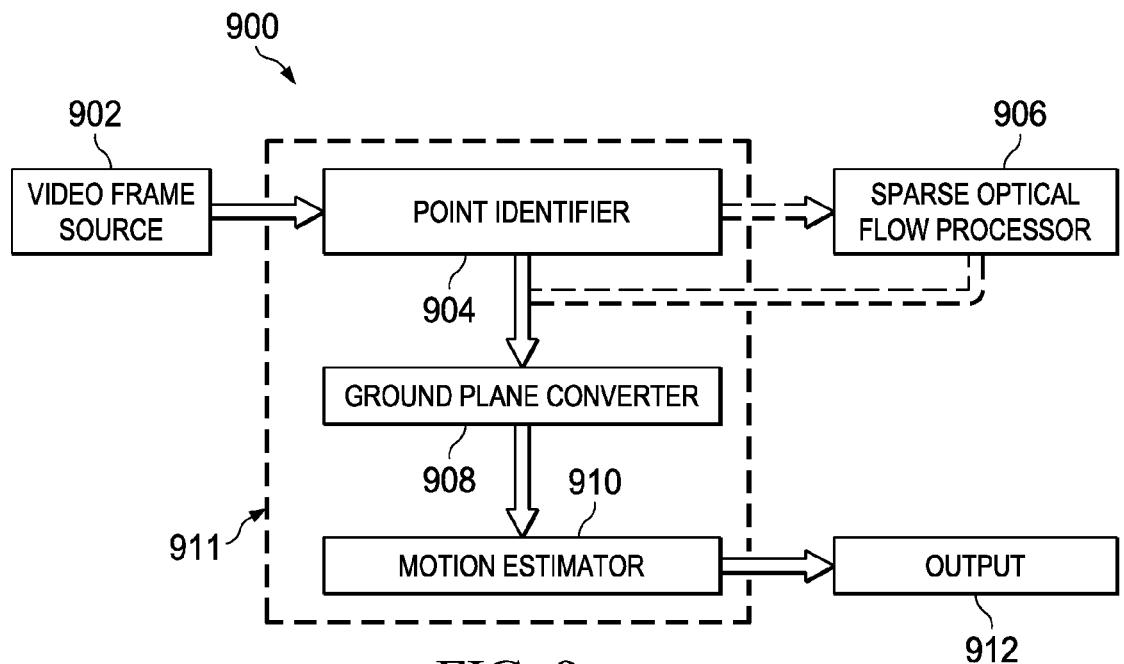
FIG. 9 is a block diagram of an example apparatus for implementing an example method.

FIG. 9 is a block diagram of an apparatus for implementing method 800 (FIG. 8). Apparatus 900 includes elements similar to cameras 310, SOF 312, and ground plane analysis unit 322 of FIG. 3. A single integrated circuit may incorporate apparatus 900 or portions of apparatus 900, such as a single system-on-chip (SoC), or various components may be on separate integrated circuits, whether independently packaged or combined in hybrid packages with the other components. For example, one integrated circuit 911 may include point identifier 904, ground plane converter 906 and motion estimator 910. Video frame source 902 provides a series or stream of input frames at a rate of, for example, 30 frames per second (fps). Point identifier 904 identifies tracking points on objects within the series of input frames provided by video frame source 902 using, for example, techniques such as Harris corners or Lucas-Kanade tracking to provide an optical flow. Point identifier 904 outputs the optical flow as a group of identified tracking points within the input frames. Optionally, sparse optical flow processor 906 can use a process such as described hereinabove regarding FIG. 5. Ground plane converter converts each of the tracked point to the ground plane using, for example, a process like step 802 (FIG. 8) described hereinabove. Motion estimator 910 estimates the motion of the tracked points in the ground plane using, for example, a process like steps 806, 808, 812, 814, 816, 818, 820, 822 and 824. Output module 912 provides the estimated motion and the location of inlier points for further use in identifying the scene by modules such as 3D point triangulation unit 320, occupancy grid mapping unit 324 and occupancy grid clustering unit 326 (FIG. 3).

Figure 10:
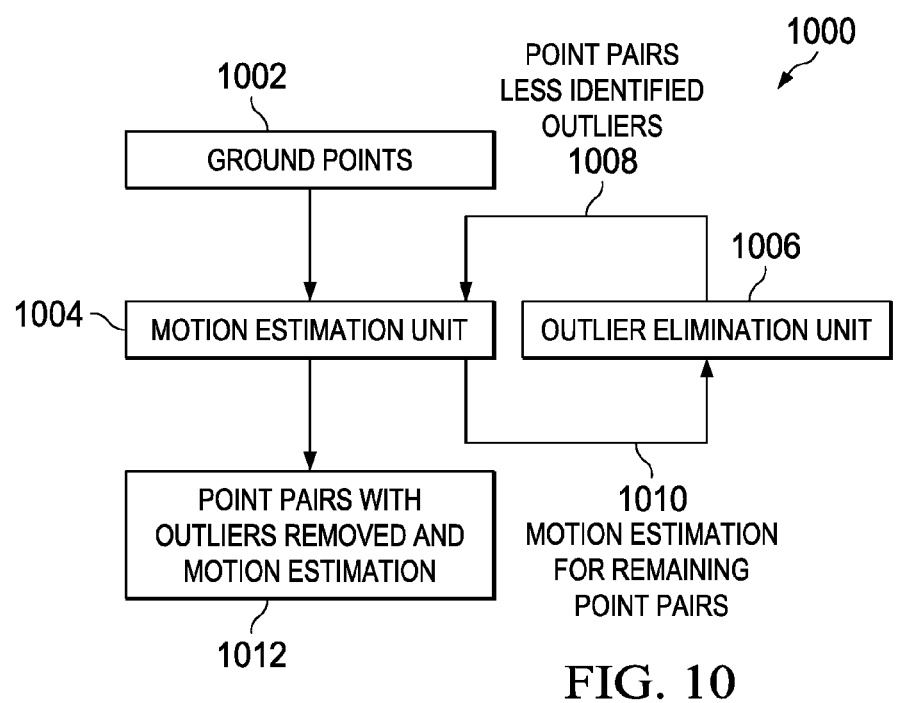
FIG. 10 is a block diagram of an example motion estimator.

FIG. 10 is a block diagram of an example motion estimator 1000. Motion estimator 1000 is similar to motion estimator 910 of FIG. 9. Motion estimation unit 1004 receives ground points 1002 from a unit like ground plane converter 908 of FIG. 9. Using point pairs, motion estimator 1004 estimates the motion of the point pairs between frames using, for example, a process like that described regarding step 804 of FIG. 8. Outlier elimination unit 1006 receives the motion estimation for remaining pairs 1010 and uses the motion information to identify and eliminate outliers using a process, for example, like the processes of steps 808 and 812 of FIG. 8. Motion estimation unit 1004 then processes the point pairs less the point pairs that are identified as outliers in 1008 to determine a refined motion estimate. Motion estimation unit 1004 and outlier elimination unit 1006 loop a number of times determined by experiment or on-board analysis of the quality of results. After a designated number of loops, motion estimation unit 1004 outputs point pairs with the outliers removed and the process performs the motion estimation 1012.

The example methods described herein provide computational efficiency while maintaining flexibility, which may be a performance goal for the implementation of multi-camera SfM on an embedded device due to high computational complexity. The architecture of FIG. 4 used together with the L2 key frame process of FIG. 5 provides flexibility with reduced memory requirements. SfM pipelines of the arrangements can vary from application to application.

The Ground Plane Ego-Motion Estimator (GPEM) estimates camera motion quickly and efficiently under the assumption of planar motion on a ground plane. While other SfM pipelines may detect and estimate the ground plane from the core SfM output, the techniques described in the example arrangements hereinabove exploit the existence of the ground plane implicitly without having to perform core SfM calculations. The example arrangements avoid the core SfM calculations, which are slow and complex, and simultaneously estimate motion and classify which points belong to the ground plane. The use of GPEM of the examples may be used independent of core SfM for motion estimation.

The GPEM can be implemented using an SoC device such as the TDA2X SoC device from Texas Instruments Incorporated described hereinabove. In alternative examples, the GPEM can be implemented using programmable devices such as microprocessors, video processors, mixed signal processors, digital signal processors, or central processing units (CPUs). Cores integrated with additional circuitry such as DSP cores, ARM cores, RISC cores and image processing cores can be used. User definable circuitry such as application specific integrated circuits (ASICs) or semi-custom or custom integrated circuits can be used. User definable programmable devices such as field programmable gate arrays (FPGAs) and complex logic programmable devices (CPLDs) can be used. Software executing on a general purpose computer, processor, or microprocessor can be used to implement the GPEM.

Modifications are possible in the described embodiments, and other embodiments are possible, within the scope of the claims.

What is claimed is:

1. An apparatus, comprising:
point identifier circuitry configured to:
 receive a first input frame and a second input frame; and
 identify point pairs on at least one object in the first and second input frames;
ground plane circuitry coupled to the point identifier circuitry, the ground plane circuitry is configured to:
 transpose a position of the point pairs to a ground plane, the ground plane having a fixed relationship in at least one dimension relative to a source of the input frames;
 detect outlier point pairs in the point pairs; and
 remove the detected outlier point pairs from the point pairs to generate inlier point pairs; and
motion estimator circuitry coupled to the ground plane circuitry, the motion estimator circuitry configured to estimate a motion of the source of the input frames by comparing the inlier point pairs between the first and second input frames.

2. The apparatus of claim 1 further comprising a sparse optical flow processor configured to select key frames from the stream of input frames and provide a sparse optical flow of the key frames to the ground plane circuitry.

3. The apparatus of claim 2, further including a plurality of processing cores.

4. The apparatus of claim 3, in which a first one of the plurality of processing cores processes the sparse optical flow at a first frame rate.

5. The apparatus of claim 4, in which a second one of the plurality of processing cores processes frames at a second frame rate that is less than the first frame rate.

6. The apparatus of claim 1 in which the estimated motion is a motion estimate of a source of the input frames in the ground plane.

7. The apparatus of claim 1 in which the outliers are determined by:
comparing a motion estimate of the point pairs to a point motion estimate for the point pairs; and
identifying the point pairs having an error between the point motion estimate and the motion estimate greater than a threshold.

8. The apparatus of claim 7 in which the error is a relative error.

9. The apparatus of claim 7 in which the error is an absolute error.

10. An apparatus, comprising:
a video frame source configured to capture a first input frame and a second input frame, the video frame source having a fixed relationship to at least one dimension of a ground plane;
point identifier circuitry coupled to the video frame source and configured to:
 receive the stream of input frames; and
 identify point pairs on at least one object in the first and second input frames;
ground plane circuitry coupled to the point identifier circuitry, the ground plane circuitry configured to:
 transpose a position of the point pairs to the ground plane;

detect outlier point pairs in the point pairs; and
remove the detected outlier point pairs from the point pairs to generate inlier point pairs; and
motion estimator circuitry coupled to the ground plane circuitry, the motion estimator circuitry configured to estimate a motion of the video frame source by of the inlier point pairs between the first and second input frames.

11. The apparatus of claim 10 further comprising a sparse optical flow processor configured to select key frames from the stream of input frames and provide a sparse optical flow of the key frames to the ground plane converter.

12. The apparatus of claim 10 in which the motion estimate is a motion estimate of a source of the input frames in the ground plane.

13. The apparatus of claim 10 in which the video frame source is a fish-eye camera.

14. The apparatus of claim 10 in which the outliers are determined by comparing the motion estimate of the plurality of point pairs to a point motion estimate for point pairs and identifying the point pairs having an error between the point motion estimate and the motion estimate greater than a threshold.

15. The apparatus of claim 14 in which the error is a relative error.

16. A method for motion estimation, comprising:
identifying point pairs in at least one object in a first input frame and a second input frame, in which a source of the first and second input frames has a fixed relationship in at least one dimension relative to the ground plane;
detecting outlier point pairs in the point pairs;
removing the detected outlier point pairs from the point pairs to generate inlier point pairs; and
estimating a motion of the source of the input frames by comparing the inlier point pairs between the first and second input frames.

17. The method of claim 16 in which the first and second input frames are part of a sparse optical flow.

18. The method of claim 17, in which the first and second input frames is input at a first frame rate.

19. The method of claim 18, in which the first and second input frames are processed by a first processing core at the first frame rate.

20. The method of claim 19, in which the first and second input frames are further processed by a second processing core at a second frame rate less than the first frame rate.

21. The method of claim 16 in which the first and second input frames is provided by a camera mounted to a vehicle.

22. The method of claim 16 in which the outlier point pairs are determined by comparing the motion estimate to a point motion estimate for point pairs and identifying the point pairs having an error between the point motion estimate and the motion estimate greater than a threshold.

23. The method of claim 22 in which the error is a relative error.

* * * * *